United States Patent [19]
Giordano

[11] 4,232,987
[45] Nov. 11, 1980

[54] MACHINE AND SERVICE TRUCK ASSEMBLY FOR LOADING, UNLOADING AND STORING CERAMIC TILES

[76] Inventor: Giavelli Giordano, Piazza Salvo d'Acquisto, 12, Sassuolo (Modena), Italy

[21] Appl. No.: 963,013

[22] Filed: Nov. 22, 1978

[30] Foreign Application Priority Data

Dec. 16, 1977 [IT] Italy .................................. 46926 A/77
Dec. 23, 1977 [IT] Italy .................................. 46927 A/77

[51] Int. Cl.³ ........................ B65G 67/02; B65G 39/02
[52] U.S. Cl. ........................................ 414/331; 198/780; 280/79.3
[58] Field of Search ................ 414/278, 285, 331; 198/780

[56] References Cited

U.S. PATENT DOCUMENTS

| 3,682,331 | 8/1972 | Fetherston | 414/331 |
| 4,094,425 | 6/1978 | Gabbrielli | 414/331 |

*Primary Examiner*—Robert G. Sheridan
*Attorney, Agent, or Firm*—Brisebois & Kruger

[57] ABSTRACT

Machine and service truck assembly for loading, unloading and storing ceramic tiles comprises a loading-unloading machine provided with a vertically mobile head constituted by a plurality of horizontal, parallel projecting brackets which are coplanar and each of which is provided upperly with a motorized roller. The head is arranged for sideways insertion into a truck constituted by a plurality of flat vertical parallel frames provided with horizontal transverse equidistant bars which overall constitute support surfaces, with the brackets inserted between the frames.

8 Claims, 5 Drawing Figures

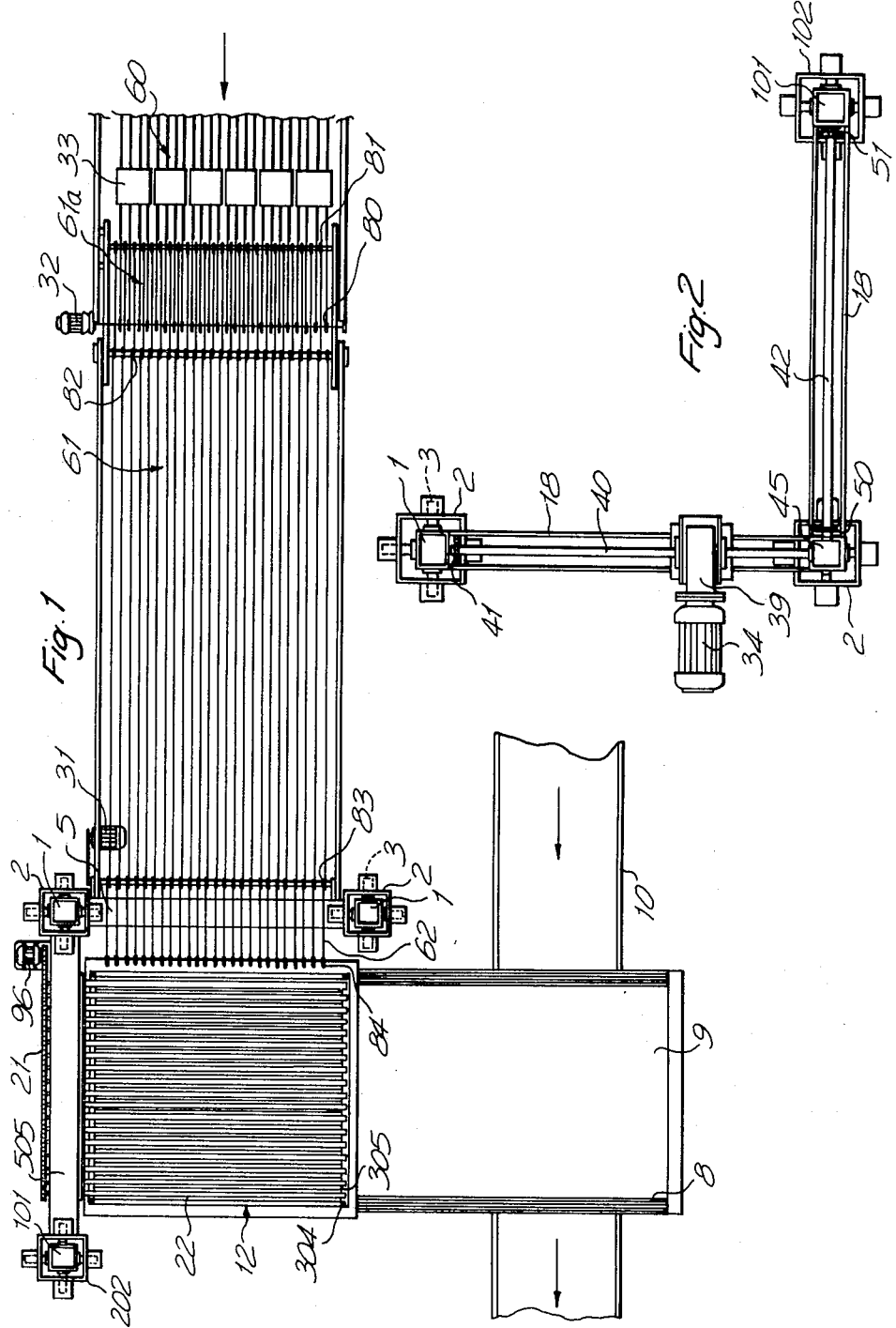

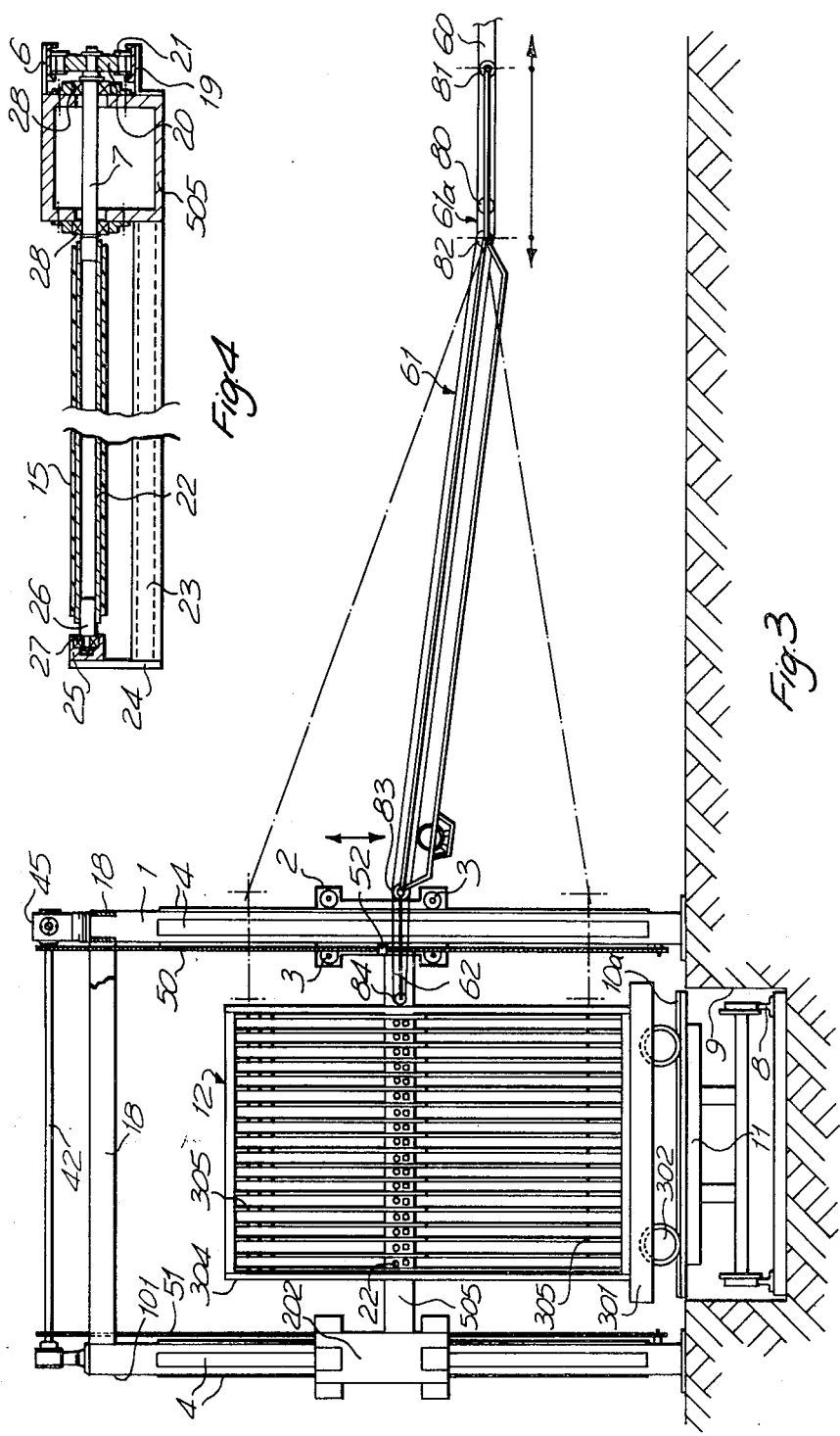

MACHINE AND SERVICE TRUCK ASSEMBLY FOR LOADING, UNLOADING AND STORING CERAMIC TILES

SUMMARY OF THE INVENTION

The present invention relates to a truck loading and unloading machine, for automatically loading and unloading ceramic materials of any shape and/or size on to and from trucks, and the special stake trucks which operate in combination with the machine to form buffer stores for material which is subjected to production processes involving its passage through a single layer firing furnace.

Single layer firing furnaces are generally used in the ceramics industry, and because of their special type of feed they have up to now created large problems in all cases in which there is an overproduction of material and it has been necessary to equip existing machines with complicated and costly devices which have required lengthy design and construction times, so affecting the running costs of the firm concerned.

In the ceramics industry it is also often necessary at various points or stations along the production line, to store for various reasons at least part of the ceramic materials which exceed the operational capacity of the stations downstream. Up to the present time, this storage requirement has created no problems, or only very few problems with regard to those materials which for the major part of the production cycle, namely during their feed to the furnace and their firing therein, are housed in refractory compartments so that they do not come into contact with each other. On the other hand, this storage requirement has created many difficulties for those production cycles in which the ceramic tiles are fired in single layer furnaces.

A first difficulty is the fact that because of the special method for feeding ceramic material to the single layer furnace, it has been necessary up to now to limit and/or adapt at least the production capacity of the glazing line so as to balance it to the hourly production of the single layer furnace, as glazed materials cannot be stacked in any way, contrary to the case in production cycles in which the tiles are housed in refractory compartments. Because of this, the glazing lines are unable to be utilised to their maximum capacity.

The aforegoing means that in the case of single layer firing furnaces, buffer stores for glazed material cannot be formed, and this leads to further large disadvantages. In this respect, the fact that buffer stores cannot be formed for glazed material upstream of the single layer firing furnace means that these furnaces cannot be automatically fed, especially during night stoppages, holidays, or strikes, so affecting the economical running of the firm. In the aforesaid cases, an effective production capacity cannot be maintained because of the extreme difficulty of providing and/or obtaining necessary and-/or sufficient labour. Moreover, because of the said storage impossibility, production upstream of the single layer firing furnace must necessarily be stopped when the furnace has to be adjusted, e.g. when firing material different from the previous material, or when it has to be serviced following damage of any type.

The object of the present invention is to provide a machine for loading and unloading ceramic tiles of any shape and/or size on to and from stake trucks, together with the stake trucks served by the machine, particularly for production cycles using a single layer firing furnace, and which is of simple, rational, functional and highly reliable construction while at the same time obviating the aforesaid drawbacks.

According to the invention, the proposed machine is constituted essentially by a vertical slide which moves with straightline reciprocating motion with a stepwise descending path and a continuous ascending path during the loading stage and vice versa during the unloading stage, and to which is hinged the downstream end of a normal swinging conveyor for feeding tiles. Said vertical slide, which is substantially of L shape in plan with its sides equal, is provided with a horizontal projecting roller system orthogonal to one of said sides of the L and contained within the dihedral formed by this latter, which overlies the plan extension of a service stake truck.

According to the invention, said service truck is of the type essentially constituted by a platform provided with normal flanged wheels for its necessary movement on rails, and comprises above said platform a vertically extending parallelepiped frame of welded tubular structure, arranged to receive and to retain a plurality of individually removable grids, the cross members of which define a plurality of horizontal surfaces to receive a relatively high number of ceramic tiles.

Spacers for said grids are provided on two parallel opposing sides of the upper and lower cornices of the parallelepiped frame, these sides preferably being those which are parallel to the running rails for the truck.

The transverse and longitudinal dimensions of the rollers comprising the machine roller system, and also their number, are such that the rollers can sit and run in the spaces defined between adjacent grids of the stake truck.

Further objects and advantages of the invention, together with its operational characteristics and constructional merits, will be further clarified and made more apparent in the detailed description given hereinafter with reference to the figures of the accompanying drawings which illustrate a preferred embodiment thereof by way of non-limiting example, and in which:

FIG. 1 is a plan view of the invention;

FIG. 2 is a plan view, rotated through 180° from the position of the previous figure, showing the upper end of the support structure relative to which the slide of the machine according to the invention slides.

FIG. 3 is a partly sectional external side view of the invention;

FIG. 4 is an axial section through a roller forming part of the roller system with which the machine according to the invention is provided;

Figure 5:
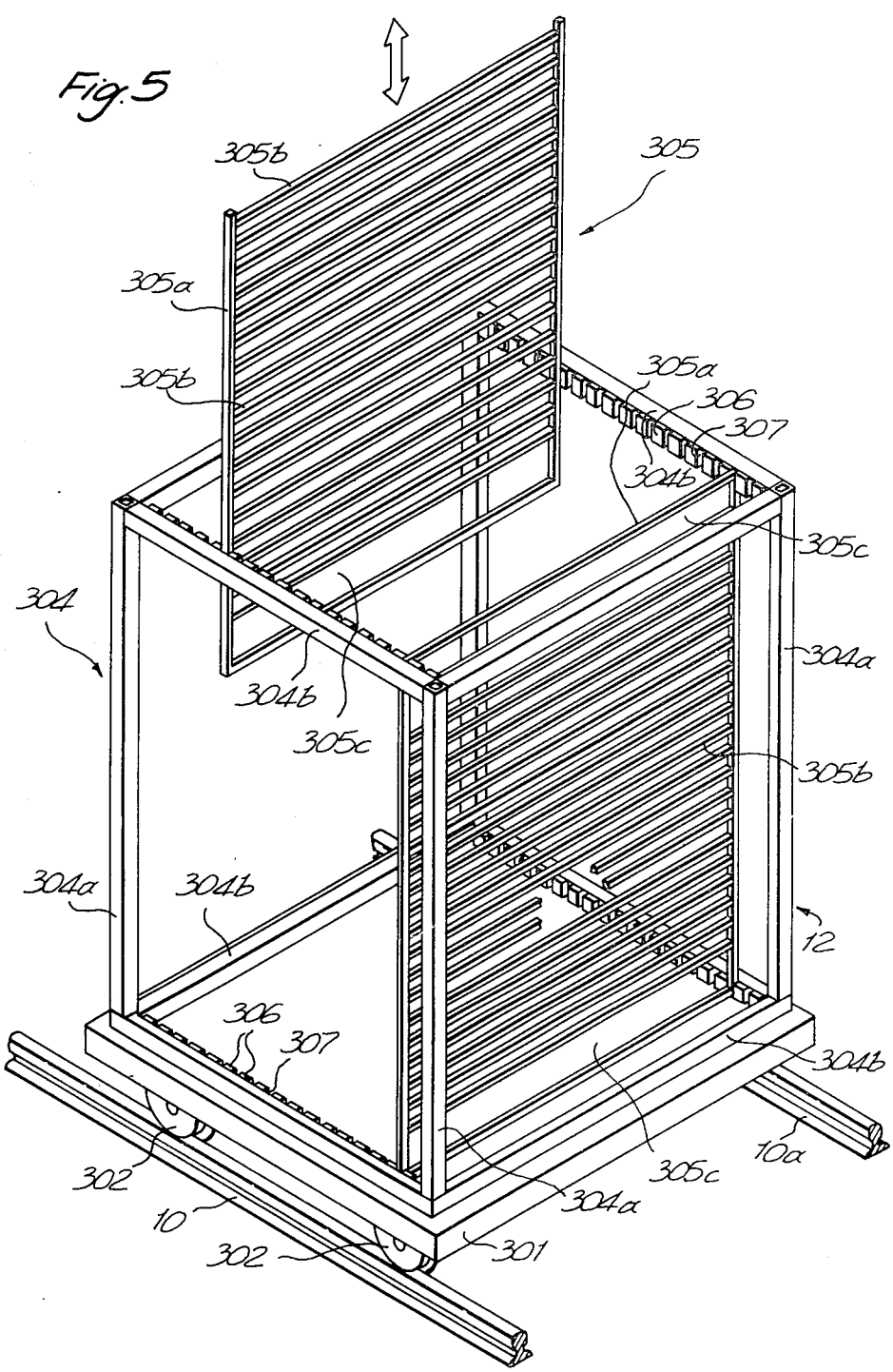
FIG. 5 is a perspective view of the stake truck.

With reference to FIGS. 1 to 3, a horizontal conveyor 60 is constituted by a plurality of V belts which, at the downstream end of said horizontal conveyor 60, pass over an equal number of grooved wheels 80 mounted on the same drive shaft, which is rotated by a motor 32. The said horizontal conveyor 60 feeds the tiles 33 to the loading-unloading machine of the invention.

Intermediate runways 61a, also constituted by a plurality of V belts, are provided at the downstream end of said horizontal conveyor 60, and are mounted slidable relative to the horizontal conveyor 60 so as to compensate the movements of the upstream end of a feed line 61 which swings in a vertical plane.

At their upstream ends, the intermediate runways 61a pass around a plurality of idle grooved wheels 81, whereas at their opposite ends, i.e. at the upstream end, they pass around a plurality of double grooved wheels 82 keyed on to the same horizontal shaft, and which define the upstream end of the swinging feed line 61 which is hinged to said intermediate runways 61a. The V belts of the swinging feed line 61 pass around the second grooves in the grooved wheels 82, and at the downstream end of the swinging feed line 61 they pass around a like number of double grooved wheels 83 keyed on the same drive shaft and driven by a power unit 31.

Finally at the downstream end of the swinging feed line 61 there is a horizontal loading conveyor 62, the V belts of which pass around the second grooves in the double grooved wheels 83, and around a plurality of grooved wheels 84. From FIG. 1 it can be seen that the loading conveyor 62 is driven by the same drive unit 31 used for driving the swinging feed line 61. This latter is hinged to a cross member 5 which supports the loading conveyor 62, and is disposed transversely to the swinging feed line 61 and connects together a pair of vertically slidable carriages 2. Each of said carriages 2 is constituted essentially by an outer casing mounted over a pier 1, and inside it, both in its upper region and lower region, there are four idle wheels 3 spaced equally apart radially and which are in continuous contact with the rolling tracks 4 provided on the outer faces of said piers 1.

Again with reference to FIG. 1, the invention comprises a further pier 101 identical to the said pair, on which is slidably mounted a third carriage 202 identical to those previously described. This latter carriage 202 is connected by a second cross member 505 to one of the previous carriages, so that said cross member 505 is disposed parallel to the swinging feed line 61.

The assembly comprising the three piers 1 and 101 and the pair of cross members 5 and 505, defines a structure which when viewed in plan is substantially of L configuration, with practically equal sides, its dihedral defined by the cross members 5 and 505 being disposed externally to the loading conveyor 62.

The piers 1 and 101 are connected together at their top by pairs of stiffening plates 18.

Above one pair of these latter there is a reducer 39 connected to the output shaft of a self-braking motor 34. A shaft 40 emerges from opposite sides of the reducer 39, and its ends are supported at the upper ends of the piers 1 (see FIGS. 2 and 3). At the corner of the said L, the free end of the shaft 40 drives a 90° transmission 45 which drives at the same speed a shaft 42 orthogonal to the said shaft 40.

At that end of the shaft 40 farthest from the position occupied by the 90° transmission 45, a sprocket is keyed on said shaft 40, and about which is wound a chain 41 which passes around a second sprocket mounted idly at the lower end of the corresponding pier 1, namely on that internal face thereof which faces the other pier 1.

Similarly, on the two ends of the shaft 42 are keyed two sprockets about which are wound two chains 50 and 51 which pass over two sprockets idly mounted at the lower ends of the pair of piers 1 and 101 (see FIG. 3), the vertical plane which contains them lying parallel and to the side of the swinging feed line 61.

Each loop cponstituted by the chains 50, 51 and 41 is connected at a point indicated by 52 in the diagram of FIG. 3, to the corresponding carriage 2 which, together with the others, defines the vertical slide of the machine according to the invention. As shown in FIG. 1, parallel and externally to the swinging feed line 61, there is a pair of rails 10 along which the stake trucks 12 run. A pit 9 is provided in the floor at said vertical slide downstream of the loading conveyor 62, to house a pair of rails 8 disposed orthogonally to the pair of rails 10 but at a lower level.

The rails 8 carry a truck 11, the platform of which is provided with two pieces of rail 10a to constitute a continuity for the rails 10. As shown in FIGS. 3 and 5, each stake truck 12 is constituted essentially by a horizontal platform 301 mounted on four flanged wheels 302 which are set on a pair of track rails 10. A vertically extending parallelepiped frame 304 of welded tubular construction is disposed concentrically on said platform 301, and is constituted essentially by four uprights 304a connected together both at their bottom and top by four cross members 304b which define a lower and an upper end cornice respectively. On the inner faces of the lower and upper cross members 304b, which oppose each other and are parallel to the track rails 10, there is a plurality of parallelepiped blocks or spacers 306 which are similar to each other and are spaced equally apart to define a comb structure on the relative inner face of the cross member 304b. Each pair of said spacers 306 or teeth of the comb structure defines a vertical passage 307 of constant cross-section, to receive the vertical perimetral edges of a grid 305.

The passages 307 are distributed at the same pitch both with regard to the upper and the lower cross members 304b.

Each of said grids 305, to be individually inserted into four coplanar passages 307, is constituted essentially by an outer framework 305a of square tubular construction, the vertical perimetral edges of which are connected together by a plurality of square tubular cross members 305b. The grids 305 are similar to each other, and the cross members 305b are distributed at the same pitch. Because of this, the upper faces of the cross members 305b of all the grids 305, and which are at the same level, are coplanar.

FIG. 5 shows that at the upper and lower ends of each grid 305 there are two apertures 305c which cannot be used for loading because of the overall dimensions of the machines proposed for this, The width of each individual grid 305 is substantially equal to the distance between the inner faces of the lower and upper cross members 304b respectively of the parallelepiped frame 304.

The height of the grids 305 is substantially equal to the height of said frame 304.

The horizontal cross members 305b of said grids 305 form a plurality of support shelves for the ceramic tiles 33.

The grids 305 are spaced equally apart to enable a roller system fitted to the machine according to the invention to be inserted between them.

With reference to FIG. 1, it can be seen that on the outside of the cross member 505 which is disposed parallel and external to the swinging feed line 61, a motor 96 is provided for driving all the rollers comprising the said roller system, by means of a chain drive.

As is more apparent from FIG. 4, a sprocket is keyed on the output shaft of said motor 96, and a chain 21 is wound about it to engage with a plurality of sprockets 20 keyed individually on a like number of spindles 7 which are rotatably supported via a pair of rolling bearings 28, by the machine cross member 505. The chain 21 is kept permanently engaged with said plurality of sprockets 20 by an upper guide 6 and lower guide 19. On that end of each spindle 7 which faces the stake truck 12, there is keyed a piece of tube 22 covered with a covering 15 which can be of rubber or a similar elastomer, and which at the other end is connected to a pivot 26. A rolling bearing 27 is disposed at the free end of the pivot 26, and is housed in a support 25, the outer dimension of which is practically the same as that of the roller 15, and which is supported by a vertical plate 24 fixed to the free end of an underlying bracket 23 branching from the cross member 505. When viewed in plan, the bracket 23 is contained within the transverse dimension of the corresponding roller 15. Finally, the machine or assembly heretofore described is fitted with a plurality of sensors, for example microswitches and photoelectric cells, for the synchronous operation of all parts of the described machine, which operates in the following manner.

At the beginning of operation, the stake truck 12 is in the position shown in FIG. 1, with the rollers 15 inserted between the various grids 305 but without making contact therewith, as the distance between them is slightly greater than the diameter of the rollers 15. In addition, the roller system and consequently the three carriages 2, 202, are at the upper end of their path such that the upper generating lines of the rollers 15 are slightly above the last tile support shelf of the stake truck 12.

The operating stages described hereinafter relate to the loading of ceramic tiles 33 on to the stake truck 12. With the described arrangement, the ceramic tiles 33 of any shape and/or size are fed along the horizontal conveyor 60 in lines which are transverse to said conveyor, and are suitably spaced apart. The lines of tiles 33 are unloaded from said horizontal conveyor 60 on to the intermediate runways 61a, which in their turn feed the swinging feed line 61. The swinging feed line 61 is fed continuously, while maintaining the vertical slide fixed in its upper limiting position, until a sufficient layer of tiles has been formed on the V belts of the swinging feed line 61, which has an extension substantially equal to the size of the loading shelves of the stake truck 12. As soon as this layer of tiles 33 has been formed, the horizontal conveyor 60 is halted, and the swinging feed line 61 unloads the layer of tiles 33 on to the upper generating lines of the rollers 15 by the loading conveyor 62 which is also driven by the motor 31 which drives the line 61. The rollers 15 are driven in a left handed direction with reference to FIG. 3, by the drive unit 96. As soon as the first line of tiles 33 of the said layer reaches the downstream region of the shelf, which means that the entire layer has been transferred on to the machine roller system, the motor 96 stops and almost simultaneously the selfbraking motor 34 receives a signal to make the slide take a step downwards to bring it substantially to the same level as the next lower shelf of the stake truck 12. In this respect, when the self-braking motor 34 is operated, it causes the sprocket keyed on to the shafts 40 and 41 to drive the chains 50, 51 and 41, which as they are connected to the carriages 2 and 202 cause these to slide on the piers 1 and 101.

During said operations, the feed line 61 is swung downwards through one step, so that the plan projection of the virtual arc through which its downstream end travels (the arc being virtual because it is not in effect traversed, this being prevented by the piers 1) is recuperated by the intermediate runways 61a which slide relative to the horizontal conveyor 60. As soon as the roller system stops at the level of the immediately lower shelf of the stake truck 12, the conveyor 60 is again started, and a further layer of tiles 33 is formed on the swinging feed line 61 in a manner similar to that previously described, and this is then unloaded on to the roller system as previously stated.

The operating cycle is then repeated a number of times equal to the number of shelves in the stake truck 12.

The conveyor 60 does not necessarily have to be stopped when transferring the layer present in the swinging line 61, because a suitable sensor, for example a microswitch or photoelectric cell of the type normally used in ceramic equipment of this kind, can be used to determine the presence of a sufficient number of transverse lines of titles to constitute the necessary layer along the members 61a, 61 and 62, it then feeding a signal to a normal device for deviating the lines of tiles 33 so that they are fed for example to a second machine or group of machines identical to that described and disposed laterally to it, while keeping the line 61 moving.

This basic concept can be especially utilised when replacing the stake trucks 12, because this requires a considerably greater time than the time necessary to make the roller system carry out a downward step.

Furthermore, when the layer of tiles 33 has been totally transferred on to the shelf of the stake truck 12, the motor 96 does not necessarily have to be stopped, but can be kept running, so continuously driving the rollers 15, provided the roller system is immediately lowered so as to deposit the tiles supported on it.

Obviously such alternative arrangements are due to the extreme flexibility of the controls of the various drive devices of the machine and the auxiliary equipment, by virtue of a plurality of microswitches and/or photoelectric cells which enable the operating stages and the beginning and end of certain operations to be combined in the most diverse ways.

When the lowest shelf of the stake truck 12 has been filled with a layer of tiles 33, the feed devices 60, 61a, 61, 62 and the roller system are stopped, and at the same time the truck 11 receives the signal to move towards the rails 10.

During the aforesaid operation, the self-braking motor 34 is obviously kept at rest, and is controlled only when the rail portions 10a of the truck 11 are aligned with the track rails 10, which means that the stake truck 12 has completely emerged from the overall plan outline of the loading-unloading machine of the invention.

In this manner, the roller system of the machine withdraws from the stake truck 12, and when the truck 11 has reached said position the self-braking motor 34 receives the signal to raise the vertical side of the machine, this time continuously, so as to return it into its upper limiting position.

The truck 12 which has thus emerged is transferred downstream of the rails 10, and the position which it occupied on the truck 11 is taken by a further stake truck 12 which is transferred on to the truck 11 from the upstream rail section 10. As soon as this replacement has taken place, the truck 11 receives the signal to move towards the loading-unloading machine, and becomes positioned within the dihedral defined by the vertical slide, and at the same time receives the roller system within its structure.

At this point, the described operating cycle terminates and the next loading cycle for a subsequent stake truck 12 is carried out in the aforesaid manner.

Although only the loading stages for the stake trucks 12 has been described, the proposed machine can also unload the said stake trucks 12 at the appropriate stations.

In the case under examination, the ascending passage is carried out stepwise during the unloading stage, while the descending passage is carried out continuously, i.e. the reverse of what takes place during loading.

The motion is made stepwise in the ascending direction in order to enable the roller system to transfer the layer of tiles 33 of one shelf on to the conveyor 62, which feeds them to the subsequent runways.

It is apparent that when the proposed machine is used for unloading stake trucks 12, its mechanical and operational characteristics are maintained unchanged, the only characteristics which can change being certain secondary ones such as the arrangement of certain drive motors for the runways, so as to maintain tension in the upper straight portions of the conveyors or runways which convey the ceramic tiles 33.

The invention is not limited to the single embodiment heretofore described, and modifications and improvements can be made thereto without leaving the scope of the invention idea, the fundamental characteristics of which are summarized in the following claims.

What is claimed is:

1. A machine and service truck assembly for loading, unloading and storing ceramic tiles, comprising:
    a horizontal frame substantially of L shape in plan, arranged to move vertically on vertical guides;
    a set of horizontal conveying belts disposed orthogonally on one arm of said L frame and terminating in a belt conveyor system;
    a set of motorised projecting rollers branching in plan from the other ram of said L frame and having a length approximately equal to the width of the set of conveyor belts, and forming a roller surface, said rollers each having spaces therebetween;
    a service truck comprising a plurality of vertical adjacent frames each provided with equidistant horizontal cross members, said frames being disposed in planes parallel to said projecting rollers, the distance between adjacent frames being greater than the outer dimension of a projecting roller and the thickness of each frame being less than the spaces between rollers so that the frames can be received in the spaces between rollers; and
    means for vertically moving said L shaped frame; and
    means for moving said truck parallel to the axis of said projecting rollers.

2. An assembly as claimed in claim 1, wherein said horizontal L shaped frame is essentially constituted by three small carriages each individually slidable on a vertical guide and connected together by two cross members to define said L shaped frame, said carriages being connected respectively to three endless chains disposed parallel to said guides and supported thereby, three sprockets driven by a common self-braking electric motor disposed above said piers, said three chains passing respectively over said three sprockets and being driven by said sprockets.

3. An assembly as claimed in claim 1, comprising means mounting each roller on said other arm for rotation; a drive sprocket for each roller on an outside of said arm; a chain extending around said sprockets; an electric motor driving said chain; an end of each roller remote from said other arm being supported by a bracket connected to the arm and extending parallel with and beneath its corresponding roller, each bracket having a transverse dimension not greater than the outer dimension of its corresponding roller.

4. An assembly as claimed in claim 1, wherein each roller comprises a covering of elastic material substantially over its entire length.

5. An assembly as claimed in claim 1, wherein said set of horizontal conveyor belts disposed on one arm of the L frame is substantially at the same level as the upper generating line of said roller surface.

6. An assembly as claimed in claim 1, wherein said service truck comprises a platform, flanged wheels on the platform and arranged to run on rails, and above said platform a vertically extending parallelepiped framework within which said plurality of vertical frames are removably disposed with said horizontal cross members disposed parallel to the axes of the wheels, said frame cross members defining a plurality of horizontal loading surfaces.

7. An assembly as claimed in claim 1, wherein inner opposing faces of the lower and upper cross members of the parallelepiped framework of the service truck comprise comb structures, one at each of said cross members, and each of which includes a plurality of like spacers distributed at a constant pitch, and between each pair of which is defined a passage to receive a vertical frame for upward withdrawal.

8. An assembly as claimed in claim 1, wherein the means for moving the service truck in a direction parallel to the axes of the rollers of said roller surface comprises a second truck movable on track rails parallel to the axes of the rollers, and on which is disposed a rail section orthogonal to said track rails, said service truck being disposed on said rail section.

* * * * *